United States Patent
Jones

(10) Patent No.: US 6,407,743 B1
(45) Date of Patent: Jun. 18, 2002

(54) SYSTEM AND METHOD FOR MORPHING BASED ON MULTIPLE WEIGHTED PARAMETERS

(75) Inventor: Michael T. Jones, San Jose, CA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/220,078

(22) Filed: Dec. 23, 1998

Related U.S. Application Data

(63) Continuation-in-part of application No. 09/175,320, filed on Oct. 20, 1998.

(51) Int. Cl.$^7$ .......................... G06F 15/00; G06T 15/50
(52) U.S. Cl. .................. 345/582; 619/473; 619/861
(58) Field of Search ..................... 345/333, 334, 345/474, 582–583, 587, 619, 636, 473, 757, 861, 863, 866, 418–419; 382/118, 117, 203, 206, 285; 707/10; 709/231, 303; G06K 9/00

(56) References Cited

U.S. PATENT DOCUMENTS

| | | | |
|---|---|---|---|
| 4,291,380 A | 9/1981 | Rohner | 345/428 |
| 4,646,251 A | 2/1987 | Hayes et al. | 345/423 |
| 4,715,005 A | 12/1987 | Heartz | 364/521 |
| 4,727,365 A | 2/1988 | Bunker et al. | 345/139 |
| 4,821,212 A | 4/1989 | Heartz | 345/426 |
| 4,888,713 A | 12/1989 | Falk | 345/425 |
| 4,912,659 A | 3/1990 | Liang | 345/434 |
| 4,912,664 A | 3/1990 | Weiss et al. | 364/578 |
| 4,933,889 A | 6/1990 | Meshkat et al. | 364/578 |
| 5,367,615 A | 11/1994 | Economy et al. | 345/429 |
| 5,448,686 A | 9/1995 | Borrel et al. | 395/120 |
| 5,745,666 A | 4/1998 | Gilley et al. | 395/128 |
| 5,760,783 A | 6/1998 | Migdal et al. | 345/430 |
| 5,808,621 A * | 9/1998 | Sundaresan | 345/595 |
| 5,831,624 A * | 11/1998 | Tarolli et al. | 345/587 |
| 5,847,712 A * | 12/1998 | Salesin | 345/429 |
| 5,960,099 A * | 9/1999 | Hayes | 382/118 |
| 5,986,675 A * | 11/1999 | Anderson | 345/473 |
| 6,054,999 A * | 4/2000 | Strandberg | 345/474 |
| 6,064,383 A * | 5/2000 | Kelley | 345/339 |
| 6,081,269 A * | 6/2000 | Quarendon | 345/419 |
| 6,108,655 A * | 8/2000 | Scheimer | 707/10 |

OTHER PUBLICATIONS

Beier, T. and Neely, S., "Feature–Based Image Metamorphosis," *Computer Graphics Proceedings*, vol. 26, No. 2, Jul. 1992, pp. 35–42.

(List continued on next page.)

*Primary Examiner*—Matthew Luu
*Assistant Examiner*—Wesner Sajous
(74) *Attorney, Agent, or Firm*—Woodcock Washburn LLP

(57) ABSTRACT

A system and method for generating new appearances of an object from a plurality of pre-defined appearances. The invention applies to a plurality of attributes for each appearance. A user may interactively specify a proportion (or weight) in which each of the pre-defined appearances is to be combined to generate a new appearance. An embodiment of the present invention then combines the attributes of the pre-defined appearances according to the respective weights to generate a new appearance. The present invention may be used to generate new expressions of a face by using pre-defined expressions such as an angry face, a happy face, a surprised face, and a sleepy face. Position and color attributes may be morphed efficiently and quickly. According to further enhancements, texture and the surface normal vector may also be morphed efficiently and quickly, even at real time frame rates. The present invention is also used to emulate or approximate representative lighting from several light source on the look of an area.

24 Claims, 8 Drawing Sheets

OTHER PUBLICATIONS

Ferguson, R.L. et al., "Continuous Terrain Level Of Detail For Visual Simulation," Presented at the Image V Conference, Phoenix, Arizona, Jun. 19–22, 1990, pp. 1–8.

Fournier, A. et al., "Computer Rendering of Stochastic Models," *Communications of the ACM,* vol. 25, No. 6, Jun. 1982, pp. 371–384.

Fournier, A. et al., "Comment on Computer Rendering a Fractal Stochastic Models", *Communications of the ACM,* vol. 25, No. 8, Aug. 1982, pp. 581–584.

Jones, M., "Lessons Learned from Visual Simulation," Designing Real–Time 3D Graphics for Entertainment SIGGRAPH '95 Course #6, May 1995, pp. 2–1—2–34.

Willis, L.R. et al., "A Method For Continuous Adaptive Terrain," Presented at the 1996 Image Conference, Scottsdale, Arizona, Jun. 23–28, 1996, pp. 1–5.

* cited by examiner

| Attribute<br>Appearance | ATTRIBUTE(i,1) | | | ATTRIBUTE(i,2) | | | | ATTRIBUTE(i,3) | | | |
|---|---|---|---|---|---|---|---|---|---|---|---|
| APPEARANCE(1)<br>(Reference) | Att(1,1a) | Att(1,1b) | Att(1,1c) | Att(1,2a) | Att(1,2b) | Att(1,2c) | Att(1,2d) | Att(1,3a) | Att(1,3b) | Att(1,3c) | Att(1,3d) |
| APPEARANCE(2) | $\Delta 2_{1a}$ | $\Delta 2_{1b}$ | $\Delta 2_{1c}$ | $\Delta 2_{2a}$ | $\Delta 2_{2b}$ | $\Delta 2_{2c}$ | $\Delta 2_{2d}$ | $\Delta 2_{3a}$ | $\Delta 2_{3b}$ | $\Delta 2_{3c}$ | $\Delta 2_{3d}$ |
| APPEARANCE(3) | $\Delta 3_{1a}$ | $\Delta 3_{1b}$ | $\Delta 3_{1c}$ | $\Delta 3_{2a}$ | $\Delta 3_{2b}$ | $\Delta 3_{2c}$ | $\Delta 3_{2d}$ | $\Delta 3_{3a}$ | $\Delta 3_{3b}$ | $\Delta 3_{3c}$ | $\Delta 3_{3d}$ |
| APPEARANCE(4) | $\Delta 4_{1a}$ | $\Delta 4_{1b}$ | $\Delta 4_{1c}$ | $\Delta 4_{2a}$ | $\Delta 4_{2b}$ | $\Delta 4_{2c}$ | $\Delta 4_{2d}$ | $\Delta 4_{3a}$ | $\Delta 4_{3b}$ | $\Delta 4_{3c}$ | $\Delta 4_{3d}$ |
| APPEARANCE(5) | $\Delta 5_{1a}$ | $\Delta 5_{1b}$ | $\Delta 5_{1c}$ | $\Delta 5_{2a}$ | $\Delta 5_{2b}$ | $\Delta 5_{2c}$ | $\Delta 5_{2d}$ | $\Delta 5_{3a}$ | $\Delta 5_{3b}$ | $\Delta 5_{3c}$ | $\Delta 5_{3d}$ |

Attribute Data for Reference Appearance
and
Exemplary Displacement Data Sets (Difference Data)

*FIG. 6*

| Attribute<br>Appearance | ATTRIBUTE(i,1) | ATTRIBUTE(i,2) | ATTRIBUTE(i,3) |
|---|---|---|---|
| APPEARANCE(1)<br>(Reference) | Att(1,1a) Att(1,1b) Att(1,1c) | Att(1,2a) Att(1,2b) Att(1,2c) Att(1,2d) | Att(1,3a) Att(1,3b) Att(1,3c) Att(1,3d) |
| APPEARANCE(2) | Att(2,1a) Att(2,1b) Att(2,1c) | Att(2,2a) Att(2,2b) Att(2,2c) Att(2,2d) | Att(2,3a) Att(2,3b) Att(2,3c) Att(2,3d) |
| APPEARANCE(3) | Att(3,1a) Att(3,1b) Att(3,1c) | Att(3,2a) Att(3,2b) Att(3,2c) Att(3,2d) | Att(3,3a) Att(3,3b) Att(3,3c) Att(3,3d) |
| APPEARANCE(4) | Att(4,1a) Att(4,1b) Att(4,1c) | Att(4,2a) Att(4,2b) Att(4,2c) Att(4,2d) | Att(4,3a) Att(4,3b) Att(4,3c) Att(4,3d) |
| APPEARANCE(5) | Att(5,1a) Att(5,1b) Att(5,1c) | Att(5,2a) Att(5,2b) Att(5,2c) Att(5,2d) | Att(5,3a) Att(5,3b) Att(5,3c) Att(5,3d) |

Attribute Data for Reference Appearance
and
Exemplary Displacement Data Sets (Actual Values)

*FIG. 7*

| APPEARANCES | ATTRIBUTES FOR REFERENCE APPEARANCE |
|---|---|
| Reference(r) | Coordinate Data<br>$X_r, Y_r, Z_r$<br><br>Color<br>$R_r, G_r, B_r, A_r$<br><br>Texture<br>$t_r, s_r, r_r, q_r$<br><br>Surface Normal Vector<br>$N_{xr}, N_{yr}, N_{zr}$ |
| Angry(a) | |
| Happy(h) | |
| Surprise(sur) | |
| Sleepy(sle) | |

Exemplary Appearances and Attributes

FIG. 8

| Attribute<br>Appearance | COORDINATE DATA | COLOR | TEXTURE | SURFACE NORMAL VECTOR |
|---|---|---|---|---|
| REFERENCE(r) | $X_r$ $Y_r$ $Z_r$ | $R_r$ $G_r$ $B_r$ $A_r$ | $t_r$ $s_r$ $r_r$ $q_r$ | $N_{xr}$ $N_{yr}$ $N_{zr}$ |
| ANGRY(a) | $\Delta X_a$ $\Delta Y_a$ $\Delta Z_a$ | $\Delta R_a$ $\Delta G_a$ $\Delta B_a$ $\Delta A_a$ | $\Delta t_a$ $\Delta s_a$ $\Delta r_a$ $\Delta q_a$ | $\Delta N_{xa}$ $\Delta N_{ya}$ $\Delta N_{za}$ |
| HAPPY(h) | $\Delta X_h$ $\Delta Y_h$ $\Delta Z_h$ | $\Delta R_h$ $\Delta G_h$ $\Delta B_h$ $\Delta A_h$ | $\Delta t_h$ $\Delta s_h$ $\Delta r_h$ $\Delta q_h$ | $\Delta N_{xh}$ $\Delta N_{yh}$ $\Delta N_{zh}$ |
| SURPRISE(sur) | $\Delta X_{sur}$ $\Delta Y_{sur}$ $\Delta Z_{sur}$ | $\Delta R_{sur}$ $\Delta G_{sur}$ $\Delta B_{sur}$ $\Delta A_{sur}$ | $\Delta t_{sur}$ $\Delta s_{sur}$ $\Delta r_{sur}$ $\Delta q_{sur}$ | $\Delta N_{xsur}$ $\Delta N_{ysur}$ $\Delta N_{zsur}$ |
| SLEEPY(sle) | $\Delta X_{sle}$ $\Delta Y_{sle}$ $\Delta Z_{sle}$ | $\Delta R_{sle}$ $\Delta G_{sle}$ $\Delta B_{sle}$ $\Delta A_{sle}$ | $\Delta t_{sle}$ $\Delta s_{sle}$ $\Delta r_{sle}$ $\Delta q_{sle}$ | $\Delta N_{xsle}$ $\Delta N_{ysle}$ $\Delta N_{zsle}$ |

Exemplary Displacement Data Set

*FIG. 9*

SYSTEM AND METHOD FOR MORPHING BASED ON MULTIPLE WEIGHTED PARAMETERS

This application is a continuation-in-part application that claims the benefit of priority to a commonly-owned, co-pending U.S. patent application entitled "Morphing Based on Multiple Weighted Parameters," U.S. application Ser. No. 09/175,320, Filed Oct. 20, 1998 (incorporated in its entirety herein by reference).

BACKGROUND OF THE INVENTION

1. Field of the Invention

The present invention relates generally to graphics systems, and more particularly to a system and method for generating different appearances of an object from a plurality of appearances made available to a graphics system.

2. Related Art

Graphics systems are often used to generate images representing objects. An object of an image may have an appearance. For example, an image may include the face of a person with different expressions such as smiling, laughing, frowning, etc.

An object, as used in the present application, may be any entity which is the subject of a representation in an image. For example, an ocean may be the subject of a representation. A snapshot image (e.g., a photograph) of an ocean is an appearance with the associated tidal waves, colors, lighting etc.

A user may wish to generate images representing different appearances of an object using a graphics system. As a practical matter, a graphics system may store (or be provided) only a limited number of images with a corresponding number of appearances. A user may desire to generate additional images with new appearances which are not already provided to the graphics system.

What is therefore needed is a system and method which allows a user to generate new appearances of images stored in a graphics system.

SUMMARY OF THE INVENTION

The present invention is directed to a system and method for generating different new appearances of an object using a plurality of appearances provided to the system. Attribute data sets corresponding to the plurality of appearances are stored in an embodiment of the present invention. The attribute data values in each set define an expression of the object. A user may then selectively specify one or more of the plurality of appearances and assign a weight to each of the appearances.

A new or different appearance is generated by combining the attribute data in the specified appearances according to the assigned weights. For example, if a user assigns a weight of 0.25 to a first appearance and 0.75 to a second appearance, all attributes in the first appearance may contribute 25% and the attributes of the second appearance may contribute 75% to the final new appearance generated in accordance with the present invention. The remaining appearances may be viewed as being assigned a weight equal to zero, i.e., these appearances do not contribute to the new appearance generated. According to a further feature of the invention, a user may interactively change the weights corresponding to any of the appearances to generate new appearances with desired attributes.

The data corresponding to different appearances may be stored in one of several ways. In one embodiment, an attribute data set corresponding to a reference appearance is stored. The attribute data sets for the remaining appearances are defined relative to the corresponding attributes in the reference attribute set. In an alternative embodiment, each of the attribute data values are defined as absolute values. In either embodiment, a user is provided the option to assign interactively the weights of the respective appearances, and a new appearance is generated by combining the stored attribute data sets according to the specified weights.

In one application, the present invention can be implemented to generate a plurality of new facial expressions. In this application, attribute data sets representing predetermined expressions (e.g., happy, grumpy, angry etc.) of a face are stored. A user may then generate new or different facial expressions by combining the stored expressions according to weights assigned by the user. For example, a user may combine an angry expression and a happy expression according to desired weights (proportions) to generate a new expression.

In another application, the present invention is applied to lighting or luminosity, wherein different light sources impact the appearance of an area being rendered. An area may include, for example, a surface, a room, a building, terrains, an entity, any graphical object or combination of graphical object and surfaces. In this application, a designer stores attribute data indicating how the area looks in the presence of light from individual light sources. The look of an area may change depending on several factors such as distance to the area, brightness level of the light source, and the surface normal vector of the object being illuminated. A user may then combine the individual light sources according to desired weights associated with each light source to generate new looks of the area.

Thus, an advantage of the invention is that it enables a user to generate new appearances. This is accomplished by providing a set of pre-defined appearances, and allowing the user to combine these appearances to generate new appearances.

Another advantage of the invention is that the user may generate new appearances in which the pre-defined appearances contribute to a desired degree to the new appearance generated. The user specifies a weight corresponding to each pre-defined appearance to control the degree of contribution of each pre-defined appearance.

The present invention may be applied in several real-world applications. For example, new expressions of a face may be generated by providing some pre-defined defined expressions to a system implemented in accordance with the present invention. Similarly, the impact of several light sources in different brightness levels on the look of an area may be assessed by using the present invention.

According to a further feature of the invention, new appearances can be generated by morphing a texture attribute and/or a surface normal vector attribute.

Further features and advantages of the invention, as well as the structure and operation of various embodiments of the invention, are described in detail below with reference to the accompanying drawings.

BRIEF DESCRIPTION OF THE FIGURES

The present invention will be described with reference to the accompanying drawings.

FIG. 6 is a table showing exemplary attribute data for a reference appearance and an exemplary displacement data set in the form of difference data for alternate appearances.

FIG. 7 is a table showing exemplary attribute data for a reference appearance and an exemplary displacement data set in the form of actual attribute values for alternate appearances.

FIG. 8 displays a list of exemplary appearances for a human face, and a list of exemplary attributes for the reference appearance of the human face.

FIG. 9 is a table showing exemplary attribute data for a reference face, and displacement data sets for four alternate appearances of the face.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE PREFERRED EMBODIMENTS

1. Overview and Discussion of the Invention

The present invention provides a system and method for generating images corresponding to new appearances of an object. Data element sets corresponding to a limited number of appearances of the object are provided. By using the image data provided, new appearances of the object are generated. A user of the system and method is provided the ability to specify a proportion (weight) in which different appearances are to be combined to generate a new appearance. In addition, a user may interactively change such proportions to generate a desired new appearance.

2. Exemplary Environment

Before describing the invention in further detail, it is useful to describe an exemplary environment in which the invention can be implemented. In a broad sense, the invention can be implemented in any system, method, or computer program product, especially one in which it is desirable to generate new appearances interactively. Such systems include, without limitation, personal computer systems (PCS), work-stations, special purpose computer systems, general purpose computer systems, and many others. The invention may be implemented in hardware, software, firmware, or combination of the like.

3. Generating New Appearances

Figure 2:
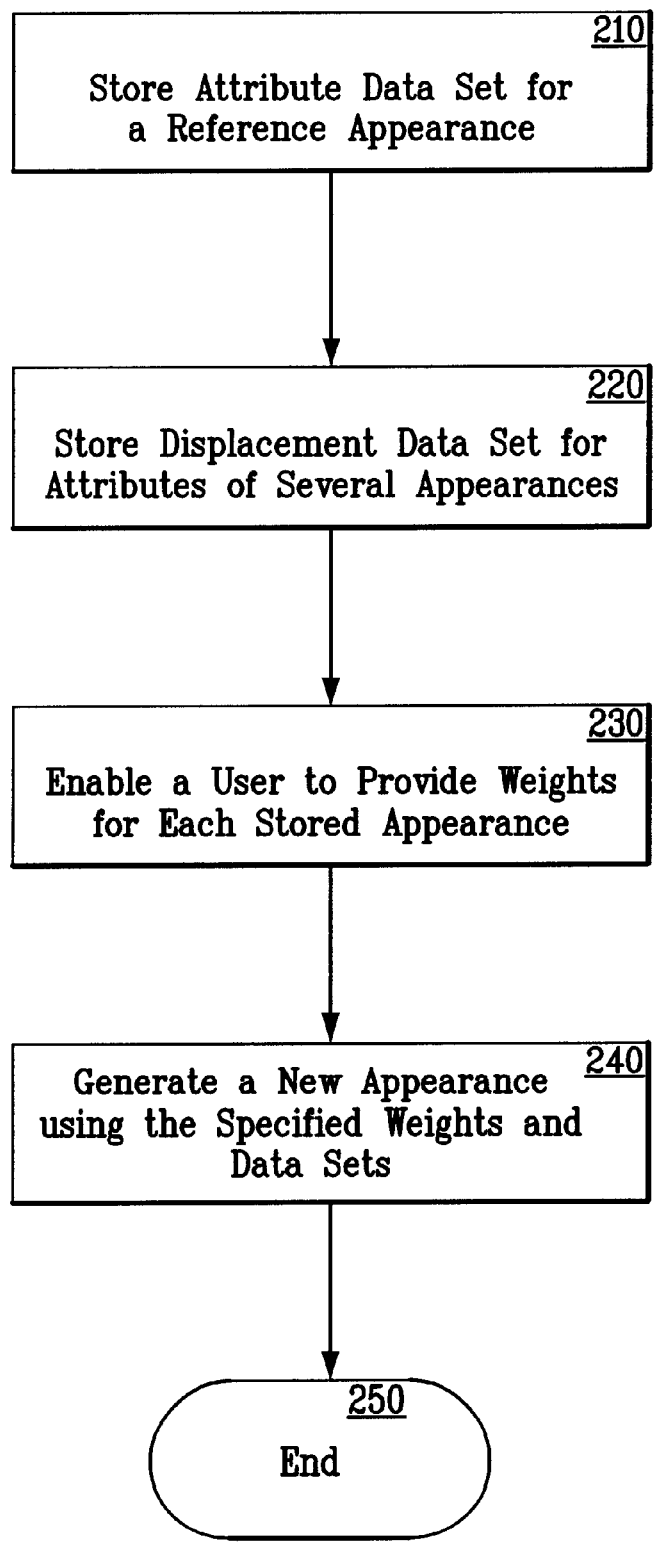
FIG. 2 is a flow-chart illustrating a method for generating new appearances from a plurality of appearances stored or otherwise made available to a system.

A method of generating new appearances in accordance with the present invention is now explained with reference to FIG. 2. FIG. 2 is a flow-chart illustrating an exemplary method for generating new expressions from a plurality of expressions provided to a system.

An object may be characterized as having one or more appearances, which may be designated as Appearance(1), Appearance(2), . . . Appearance(i), . . . Appearance(n). For a human face, these may be appearances such as a reference appearance, an angry appearance, etc. This implementation will be described further in Section 4, below.

Also, each appearance will have one or more attributes associated with it, these may be designated as Attribute(1,1), Attribute(1,2), . . . Attribute(i,j), . . . Attribute(n,m), where the designation "i,j" indicates Attribute "j" of Appearance "i." For the example of a human face, the attributes may be position coordinates, color, texture, surface normal vector, etc. Again, these will be described further in Section 4, below.

In step 210, attribute data is stored for a reference appearance of an object. The data may be stored, for example, in a memory (volatile or non-volatile) of a computer system implementing the present invention. The reference appearance can be, for example, a typical or common appearance of the object, and may be designated as Appearance(1). One or more attributes may be stored for this reference appearance, such as Attribute(1,P), Attribute(1,Q), and Attribute(1,R). It should be noted that each attribute may have one or more "sub-attributes." As an example, if one attribute were "color," there would typically be four sub-attributes (also called components) (red, green, blue, and alpha), and if another attribute were "coordinates," there would typically be three sub-attributes corresponding to the locations on the X, Y, and Z axes.

In step 220, a displacement data set is stored for each attribute of the other appearances. In an embodiment, this data is stored as difference data. For example, the difference between the value of an attribute, "j," of Appearance(1) and the value of the same attribute of Appearance(2) may be stored as $\Delta 2_j$. See the table in FIG. 6 for an example with five appearances and three attributes. Note that $\Delta 2_j$ is the difference between the actual value of the attribute "j" at Appearance(1) and the actual value of the attribute "j" at Appearance(2). That is:

$$\Delta 2_j = \text{Attribute}(1,j) - \text{Attribute}(2,j)$$

In FIG. 6, attribute 1 is shown as having three sub-attributes and attributes 2 and 3 are shown as having four sub-attributes. These examples are for illustrative purposes only, and are not meant to be limiting. For every appearance, each particular attribute (including its sub-attributes, if any), for example Attribute(i,j), is referred to as a data element. The set of all data elements for an appearance, for example Appearance(i), is referred to as a data element set. As an example, in the table of FIG. 7, Attribute (1,1) through Attribute(5,3) are each data elements, and a row of data elements is a data element set. That is, for example, Attribute (2,1), Attribute (2,2), and Attribute (2,3) is a data element set.

In an alternate embodiment, the displacement data set for each attribute is stored as a mathematical equation. That is, an equation describing the difference between the value of attribute "j" at Appearance(1) and the value of attribute "j" at Appearance(2) may be stored. For example, the mathematical equation may be a vector which defines how a point is to morph to a new position. An example of such a vector is described in co-pending patent application entitled "Providing a Framework for Level-of Detail Transformations," application Ser. No. 08/749,275, filed Nov. 13, 1996, which is incorporated by reference. Similarly, equations can be stored to describe the displacement between Appearance(1) and Appearance(3), between Appearance(1) and Appearance (4), and so on.

In another embodiment, the actual values of the attribute data for each appearance may be stored. See, for example, FIG. 7. Typically, by storing such actual values, this embodiment consumes additional storage space.

Also, even though steps 210 and 220 are described as storing the attribute data and the displacement data sets, it will be appreciated that attribute data and displacement data sets may otherwise be provided to subsequent steps of flow-chart 200. For example, the attribute data and the displacement data sets may be generated and provided from outside of a system implementing the present invention.

In step 230, the present invention enables a user to specify weights for each of the stored appearances. In an embodiment of the present invention, a user may specify weights for only those attributes for which a value is stored in step 220. For example, if attributes for Appearance(2) and Appearance (3) are stored as displacement data in step 220, a user may desire that a new appearance be weighted 25% Appearance (2) and 35% Appearance(3). The weight to be applied to the reference appearance, Appearance(1), would be computed as 40% (i.e., 100%−(25%+35%)=40%). Thus, the new appearance would be 40% Appearance(1), 25% Appearance (2), and 35% Appearance(3). In the embodiment wherein the displacement data for an attribute is stored as the difference between the attribute for the reference appearance and the attribute for the alternate appearance (e.g., it is stored as $\Delta 2_j$), the attribute values for new appearance will be calculated as the attribute value of the reference appearance plus the weighting percentages times the differences between the reference appearance and the alternate appearances. In the example above, the value of an attribute "j" for the new appearance, "New," will be:

$$\text{Attribute}(\text{New},j)=[\text{Attribute}(1,j)]+25\%[\Delta 2_j]+35\%[\Delta 3_j]$$

This calculation holds true for all attributes which apply to the designated appearances.

In an alternative embodiment, a user may specify weights for all the appearances. Such a scheme may be particularly suited for an embodiment which stores the actual values of all attribute data. However, the scheme may be implemented to specify a weight for a reference appearance in an embodiment which represents attribute data sets relative to a reference appearance. Also, a user may use graphical schemes (e.g., pie chart, bar chart etc.) to specify the weights. It will be appreciated, based on the description contained herein, that different schemes of specifying the weights may be employed without departing from the scope and spirit of the present invention.

In step 240, the present invention generates a new appearance by combining the attribute data according to the weights specified in step 230. In the new appearance generated, each expression contributes according to its respective weight. This is explained below with reference to several examples.

4. Application of the Present Invention to Generate Different Facial Expressions There are several applications of the present invention. In one application, the invention may be employed to generate different expressions of a human face. Different facial expressions are examples of appearances. In the present example, attribute data for the face of a person is stored in a reference expression and difference data is stored corresponding to alternate expressions. These may be (1) a reference appearance, (2) an angry face, (3) a happy face, (4) a surprised face, and (5) a sleepy face. The attributes associated with these appearances might be (1) coordinate data and (2) color.

According to a further feature of the present invention, two other attributes are (3) texture and (4) surface normal vector. Based on the teaching contained herein, those skilled in the relevant arts will appreciate that any number of appearances and attributes may be used to describe an object, and this illustrative example is not meant to be limiting.

As stated above, each of these attributes may have sub-attributes. As an example, the sub-attribute data that may be stored for the reference appearance may include three dimensions of coordinate data (e.g., $X_r$, $Y_r$, $Z_r$), four color components (e.g., $R_r$, $G_r$, $B_r$, $A_r$), four characteristics of texture space (e.g., $t_r$, $s_r$, $r_r$, $q_r$), and three vector components representing the surface normal vector (e.g., $N_{xr}$, $N_{yr}$, $N_{zr}$). These attributes/sub-attributes are shown in the table of FIG. 8. In addition, there are similar sets of attributes/sub/attributes (not shown) for every other appearance. FIG. 8 shows a table of exemplary appearances. In particular, FIG. 8 shows five appearances: reference (r), angry (a), happy (h), surprise (sur), and sleepy (sle). This example is provided for illustrative purposes only, and is not limiting.

A user may specify a combination of expressions with corresponding weights, and the present invention generates a new expression according to the weights. A user may interactively specify the weights to generate a desired expression of the face. The example is described in detail with reference to FIGS. 1 and 3 below.

Figure 1:
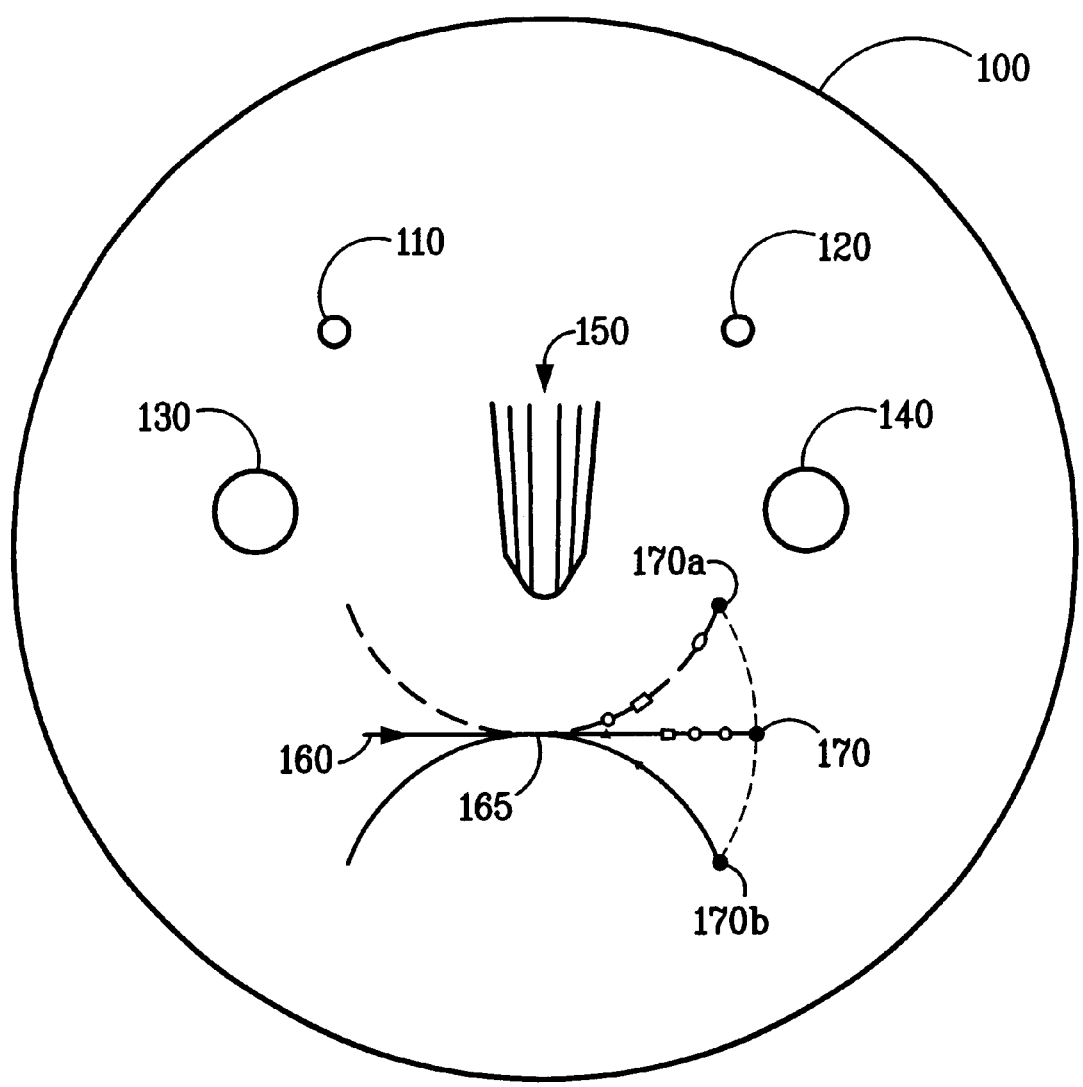
FIG. 1 is a drawing representing a face of a person in different expressions.

FIG. 1 is diagram of a face 100 of a person. For illustrative purposes, face 100 is shown as being comprised of a plurality of points, such as eyes 110 and 120, cheeks 130 and 140, a nose 150, and a mouth 165 comprised of end points 160 and 170. Each point on face 100 will have attributes associated with it. For example, eye 110 will have a set of coordinate data, a set of color data, a set of texture data, and a surface normal vector. There will be an attribute data set for each attribute for the reference appearance of face 100, and an attribute data set for each attribute for each alternate appearance.

The table shown in FIG. 9 illustrates an exemplary attribute data set for the reference appearance of face 100. The table also illustrates exemplary displacement data sets for alternate appearances of face 100 (i.e., angry, happy, surprise, sleepy). In this example, the displacement data sets are displayed as difference data. Face 100 is in the reference appearance when it has its common (usual) expression. As an example, the attribute data that may be stored for each point when face 100 is in the reference appearance may include three dimensions of coordinate data (e.g., $X_r$, $Y_r$, $Z_r$) four color components (e.g., $R_r$, $G_r$, $B_r$, $A_r$), four characteristics of texture space (e.g., $t_r$, $s_r$, $r_r$, $q_r$), and three vector components representing the surface normal vector (e.g., $N_{xr}$, $N_{yr}$, $N_{zr}$). The displacement data sets for each point on face 100 when face 100 has an angry appearance is stored as difference data and may be stored as the following displacement data set: $\Delta X_a$, $\Delta Y_a$, $\Delta Z_a$; $\Delta R_a$, $\Delta G_a$, $\Delta B_a$, $\Delta A_a$; $\Delta t_a$, $\Delta s_a$, $\Delta r_a$, $\Delta q_a$; $\Delta N_{xa}$, $\Delta N_{ya}$, $\Delta N_{za}$. As shown in FIG. 9, similar displacement data sets may also be stored for the difference data between the reference appearance and the happy appearance, the surprised appearance, and the sleepy appearance.

In a rudimentary example, when face 100 is in the reference appearance, mouth 165 is represented by a straight line between end point 160 and end point 170. End point 160 and end point 170 each will have an attribute data set for the reference position. Similarly, cheeks 130 and 140 will also have attribute data sets for the reference appearance. The other points on face 100 will also have attribute data sets for the reference appearance, but for ease of discussion and understanding, only mouth 165 and cheeks 130 and 140 will be discussed here. If the appearance were to change from the reference appearance to the angry appearance, the coordinates of end point 170 will change by an amount equal to $[\Delta X_a, \Delta Y_a, \Delta Z_a]_{170}$, its color will change by an amount $[\Delta R_a, \Delta G_a, \Delta B_a, \Delta A_a]_{170}$, its texture by an amount $[\Delta t_a, \Delta s_a, \Delta r_a, \Delta q_a]_{170}$, and its surface normal vector by an amount $[\Delta N_{xa}, \Delta N_{ya}, \Delta N_{aa}]_{170}$. Likewise, the coordinates of cheek 130 and cheek 140 will change by amounts equal to $[\Delta X_a, \Delta Y_a, \Delta Z_a]_{130}$ and $[\Delta X_a, \Delta Y_a, \Delta Z_a]_{140}$, their color will change by amounts $[\Delta R_a, \Delta G_a, \Delta B_a, \Delta A_a,]_{130}$ and $[\Delta R_a, \Delta G_a, \Delta B_a, \Delta A_a]_{140}$, their texture by amounts $[\Delta t_a, \Delta s_a, \Delta r_a, \Delta q_a,]_{130}$ and $[\Delta t_a, \Delta s_a, \Delta r_a, \Delta q_a]_{140}$, and their surface normal vectors by amounts $[\Delta N_{xa}, \Delta N_{ya}, \Delta N_{za}]_{130}$ and $[\Delta N_{xa}, \Delta N_{ya}, \Delta N_{za}]_{140}$. It should be noted that not all difference attributes need to be present for each appearance. (For example, there may be no change in texture for end point 170 from the reference appearance to the angry appearance.)

Figure 3:
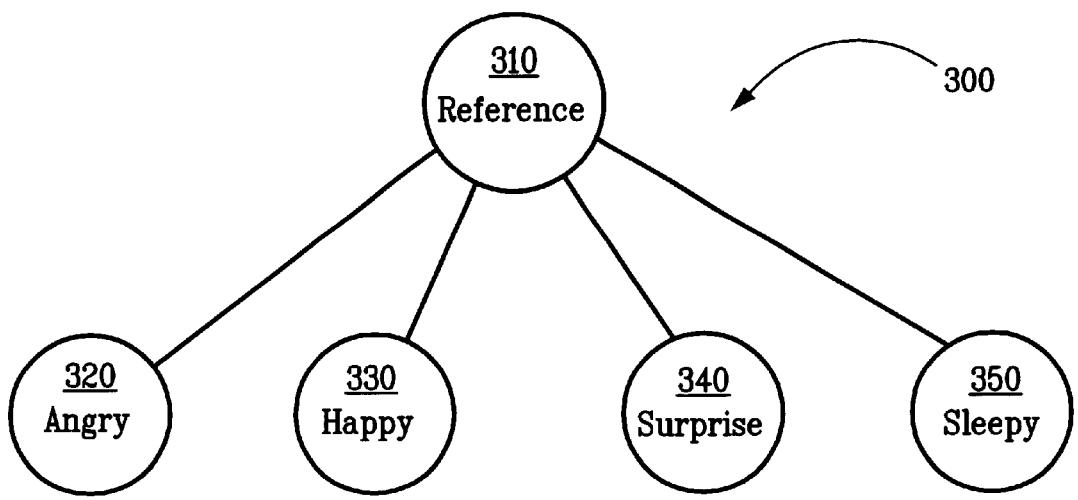
FIG. 3 is a graph illustrating the attribute data representation of expressions of a face.

Graph 300 of FIG. 3 is a pictorial representation of an exemplary data structure for storing attribute data corresponding to different appearances of an object. In the example of face 100, graph 300 may represent parts of the face or the entire face. Each node of graph 300 corresponds to a different appearance of the object. Thus, for the example of face 100, a node 310 stores attribute data for the reference appearance, a node 320 stores displacement data sets for the angry appearance, a node 330 stores displacement data sets for the happy appearance, a node 340 stores displacement data sets for the surprised appearance, and a node 350 stores displacement data sets for the sleepy appearance. If graph 300 represents only a portion of face 100, then there will be comparable graphs (not shown) for other portions of face 100.

In an embodiment, the displacement data sets stored in nodes 320, 330, 340, and 350 for the non-reference appearances of face 100 (i.e., angry, happy, surprise, and sleepy) are stored as difference data. In this embodiment, intermediate displacement data sets may also be stored. For example, in node 330, difference data for coordinates may be stored for a 30% happy face as well as for the maximum happy face. In an alternate embodiment, the displacement data sets stored in nodes 320, 330, 340, and 350 may be actual values corresponding to the attributes of each appearance. In another alternate embodiment, the displacement data sets may be stored as a mathematical equation or a vector. In this embodiment, the equation may represent how a face 100 changes gradually from the reference appearance to, for example, the happy appearance, and will represent various degrees of smiling.

The table of FIG. 9 shows the attribute data for the reference appearance and the displacement data sets for the alternate appearances (i.e., angry, happy, surprise, sleepy). As stated above, the displacement data, while shown here as difference data, may also be stored as the actual values of the attributes or as mathematical equations. For ease of discussion, only the case wherein the displacement data is stored as difference data will be described.

The set of data shown in the Table of FIG. 9 is stored for each point on the object. In the example of face 100, a set of attribute data for each attribute is stored for the reference appearance for eye 110, eye 120, cheek 130, cheek 140, nose 150, and endpoints 160 and 170 of mouth 165. In addition, difference data for each attribute may stored for the angry appearance for eye 110, eye 120, cheek 130, cheek 140, nose 150, and end points 160 and 170 of mouth 165. (Some points may not have difference data for each attribute stored for each appearance, if there is no change in that attribute for that appearance. For example, there may not be a change in color of nose 150 for the sleepy appearance. Thus, that displacement data set would be left blank.) Likewise, difference data may be stored for each point for the happy, surprised, and sleepy appearances.

The manner in which the above stored data can be used to generate different appearances of face 100 is now described. As noted with reference to step 230 of FIG. 2, a user may specify weights for each of the appearances stored in graph 300. For example, a user may specify an appearance which is 30% happy, 20% surprised, and 10% sleepy. The weight of the reference appearance can be computed as $$100\% - (30\% + 20\% + 10\%) = 40\%$$

An alternative embodiment may optionally require that the user specify 40% for the reference node, instead of computing the weight corresponding to the reference node.

In step 240, an embodiment of the present invention generates a new appearance by adding the attribute data according to the weights specified in step 230. This process is performed for each point on face 100.

According to a further feature of the invention, new appearances can be generated by morphing a texture attribute and/or a surface normal vector attribute.

Texture Attribute Morphing

As an example, consider the "texture" attribute of FIG. 9, as it applies to cheek 140.

The reference texture attributes for cheek 140 may be retrieved from node 310 and described as:

$$\text{Attribute(Ref,Texture)}_{140} = [t_r, s_r, r_r, q_r]_{140}$$

The angry texture attributes for cheek 140 may be obtained by combining the attribute data in node 310 with the attribute data in node 320 and described as:

$$\text{Attribute(Angry,Texture)}_{140} = [t_r + \Delta t_a, s_r + \Delta s_a, r_r + \Delta r_a, q_r + \Delta q_a]_{140}$$

The happy texture attributes for cheek 140 may be obtained by combining the attribute data in node 310 with the attribute data in node 330 and described as:

$$\text{Attribute(Happy,Texture)}_{140} = [t_r + \Delta t_h, s_r + \Delta s_h, r_r + \Delta r_h, q_r + \Delta q_h]_{140}$$

The surprised texture attributes for cheek 140 may be obtained by combining the attribute data in node 310 with the attribute data in node 340 and described as:

$$\text{Attribute(Surprise,Texture)}_{140} = [t_r + \Delta t_{sur}, s_r + \Delta s_{sur}, r_r + \Delta r_{sur}, q_r + \Delta q_{sur}]_{140}$$

The sleepy texture attributes for cheek 140 may be obtained by combining the attribute data in node 310 with the attribute data in node 350 and described as:

$$\text{Attribute(Sleepy,Texture)}_{140} = [t_r + \Delta t_{sle}, s_r + \Delta s_{sle}, r_r + \Delta r_{sle}, q_r + \Delta q_{sle}]_{140}$$

Note that in this example, the actual attribute values of the non-reference appearances are displayed as the sum of the reference attribute value and the difference value. In the embodiment wherein the displacement data set is the actual values of the attributes, this calculation would not need to be made.

In this example, the attribute data for the new appearance may be generated as follows:

$$[\text{Attribute(Angry,Texture)}_{140} \cdot 0\%] + [\text{Attribute(Happy,Texture)}_{140} \cdot 30\%] + [\text{Attribute(Surprise,Texture)}_{140} \cdot 20\%] + [\text{Attribute(Sleepy,Texture)}_{140} \cdot 10\%] + [\text{Attribute(Ref,Texture)}_{140} \cdot 40\%] = \text{Attribute(New,Texture)}_{140}$$

Note that since the angry appearance has no weight in the desired new appearance, the displacement data set $[\Delta t_a, \Delta s_a, \Delta r_a, \Delta q_a]_{140}$ does not need to be retrieved and the multiplication does not need to be performed.

Surface Normal Vector Morphing

The previous example reflected the morphing of the texture attribute of one point. The same approach described above is used to morph the surface normal vector for a point. Thus, using the same weighting as above, the surface normal vector for a new appearance of point 140 would be described by the equation:

Attribute(New,Surface Normal Vector)$_{140}$=[Attribute(Angry,Surface Normal Vector)$_{140}$·0%]+

[Attribute(Happy,Surface Normal Vector)$_{40}$·30%]+[Attribute(Surprise,Surface Normal Vector)$_{140}$·20%]+

[Attribute(Sleepy,Surface Normal Vector)$_{140}$·10%]+[Attribute(Ref, Surface Normal Vector)$_{140}$·40%]

The equations above reflect the weighting value being multiplied times the corresponding attribute values. In an alternate embodiment, the system may store several displacement values for each attribute with each value corresponding to a weight. In yet another embodiment, a mathematical equation may be used to model the displacement as a function of weight.

If a user desires to change the appearance, he or she may simply specify a new weight for the corresponding feature. In the above example, a user may wish to have the expression look more surprised, and accordingly change the weight for the surprise appearance component from 20% to 25%. Accordingly, the reference appearance would only contribute 35% (i.e., 40−5%) instead of 40%.

By interactively adjusting the weights of different appearances, a desired expression may thus be achieved. A designer of graph 300 (or any similar data structure) may refine the attribute data in graph 300 to enable a user to generate more realistic expressions. For example, extensive studies may be conducted with people skilled in the relevant arts to understand how a point on the face transforms in coordinates, color, texture, and surface normal vectors while changing from a happy appearance to an angry appearance, and the data may accordingly be designed.

Even though the present invention is described in the context of a human face, it will be appreciated that the present invention may be practiced with other types of objects and associated appearances without departing from the scope and spirit of the present invention. For example, the present invention may be used in luminosity applications as described below.

The same approach described above is used to morph the color attribute and the coordinate data for a point, and to morph all attributes for all points.

5. Application of the Present Invention to the Area of Luminosity

Another application of the present invention is in the area of luminosity. Luminosity is a field in which a user attempts to assess the look of an area in the presence of various light sources. The look of an area is an example of an appearance of the area. As used in this application, an area may include one or more surfaces, or a room, or a building, or any entity, or the combination of these.

The manner in which the appearance of an area in the presence of several light sources can be determined is now broadly explained. First, a designer identifies the impact of each light source on an area. For example, the designer may determine the color of each portion of the area in the presence of individual light sources. The designer then provides a data element set corresponding to each light source, with each data element set identifying the appearance of the area in the presence of the light source alone. Thus, the designer typically provides several data element sets to a system implementing the present invention, with each set identifying the impact of an individual light source.

A user may then use the system to interactively determine the look of an area in the presence of multiple light sources. The user may specify different weights associated with each light source. A weight of zero may indicate that the corresponding light source is turned off. A non-zero weight may indicate the relative intensity of the light source. Thus, a higher value for an a weight associated with a light source may indicate that the light source is lighted with a higher level of intensity. An equal weight associated with each light source can indicate that all the lights are lighted with the same level of intensity.

Figure 4:
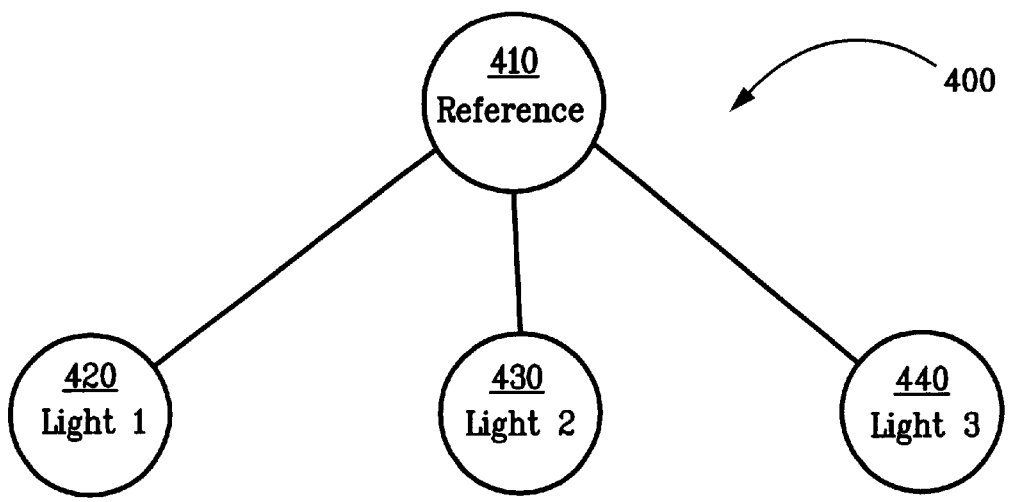
FIG. 4 is a graph illustrating the attribute data representation of looks of an area in the presence of lights.

An exemplary environment implemented in accordance with the present invention is now described. FIG. 4 is a graph representing an exemplary data structure for modeling an environment for luminosity studies. Graph 400 includes four nodes 410, 420, 430, and 440. Each node corresponds to a data element set representing the appearance of an area in the presence of a light source. A data element set may comprise attribute data values for each portion of the area. In one embodiment the attributes stored may include color, texture, coordinates, reflectivity, transparency etc. In an alternate embodiment, a designer may assess the impact of factors such as reflectivity and transparency on the look of a area and then determine color attribute values for each light source based on the assessment.

The data element sets may be represented in one of several ways. In one embodiment, node 410 represents absolute values corresponding to attributes of a representation corresponding to one light source (termed reference light source). The remaining nodes 420, 430, and 440 (representing appearances corresponding to light sources LIGHT1, LIGHT2, and LIGHT 3 respectively) store the displacement attribute values. The displacement values may correspond to a difference from the corresponding attribute of the reference attribute data set 410.

In an alternative embodiment, all nodes 410, 420, 430 and 440 store the absolute attribute values. Thus, in this embodiment, steps 210 and 220 may be combined into one step. It will be appreciated that storing absolute values typically requires more storage space compared to storing displacement values. However, both embodiments can store information representing the same appearance.

A user may then interactively specify brightness levels corresponding to all light sources represented by graph 400 in step 230. According to one convention, a weight of 0 may specify that the corresponding light source is turned off. A non-zero value specifies the intensity (brightness) of the light source. Thus, a low non-zero weight value may specify that the light source is dim.

In response to the specification of the brightness levels, the system then generates an image indicative of the look (appearance) of the area in the presence of the light sources by combining the data in the nodes 410, 420, 430, and 440. If nodes 420, 430, and 440 store displacement values, such combining may entail, for example, adding (or subtracting) from the absolute values stored in node 410 the corresponding displacement values stored in nodes 420, 430, and 440 according to the weights specified by the user.

If all nodes 410, 420, 430 and 440 store absolute values, such combining may entail adding corresponding attribute values according to the specified weights. The resulting attribute values define a new appearance of the surface. Even though the combining function is explained in terms of addition/subtraction, it should be understood other means of combining may be employed without departing from the scope and spirit of the present invention.

The user may then fine-tune the weight associated with each light source as in step 240 until a desired look is attained. The user may then use the corresponding weights in designing a lighting model for a area.

6. Implementation in an Exemplary Computer System

Figure 5:
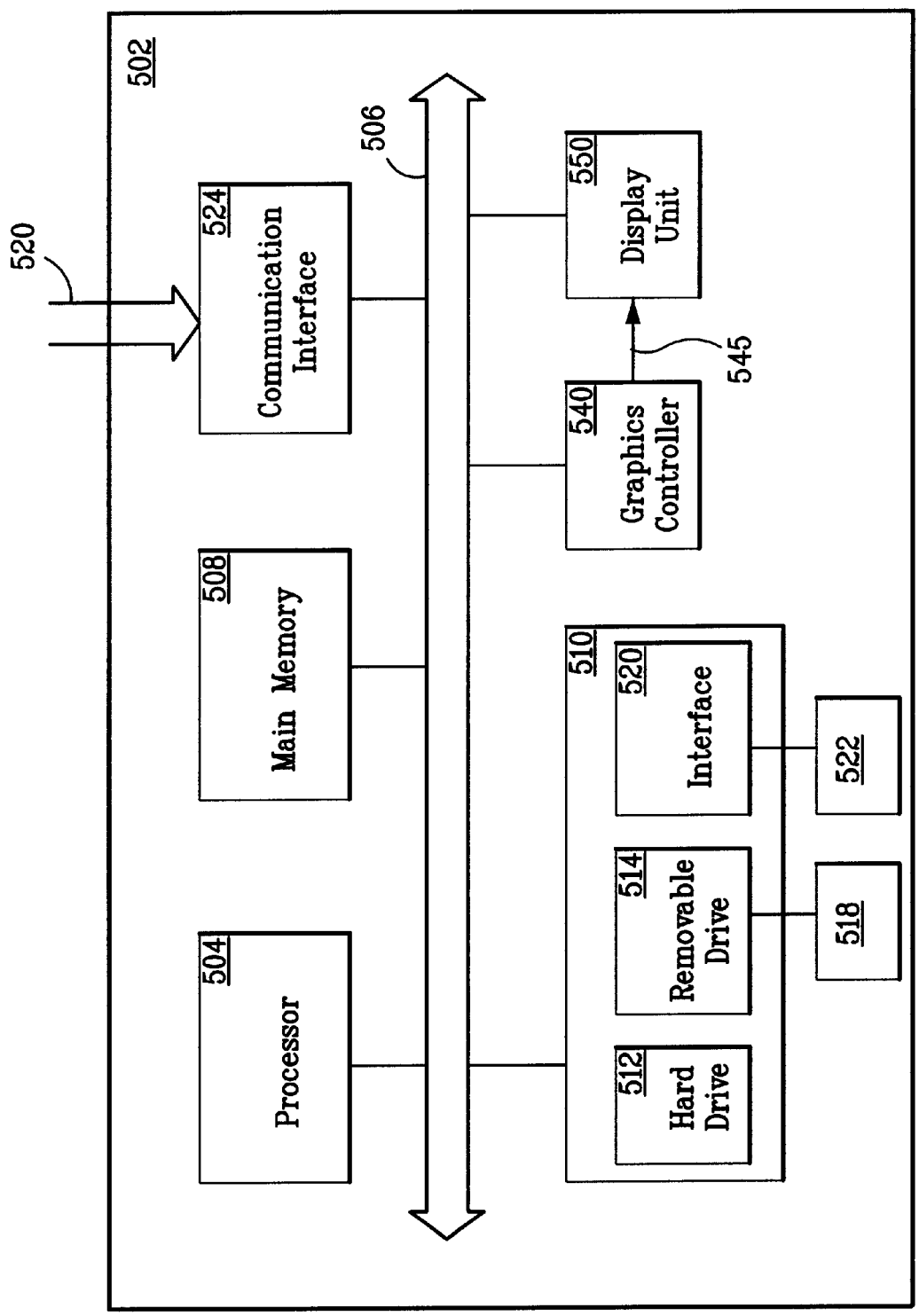
FIG. 5 is a block diagram of an exemplary computer system implementing the present invention.

As noted above, the invention may be implemented using hardware, software or a combination thereof and may be implemented in a computer system or other processing system. In fact, in one embodiment, the invention is directed toward a computer system capable of carrying out the functionality described herein. An exemplary computer system 502 is shown in FIG. 5. Computer system 502 includes one or more processors, such as processor 504. Processor 504 is connected to a communication bus 506. Various software embodiments are described in terms of this exemplary computer system. After reading this description, it will become apparent to a person skilled in the relevant art how to implement the invention using other computer systems and/or computer architectures.

Computer system 502 also includes main memory 508 (preferably random access memory), secondary memory 510, graphics controller 540, and display unit 550. In one embodiment, processor 504 performs the steps of the flowchart of FIG. 2, and sends display data representative of new appearances to graphics controller 540 using bus 506. Graphics controller 540 may process the display data and generate display signals on bus 545. In response to the display signals, display unit 550 generates an image representative of the new appearance.

It should be understood that the functions of the individual components of computer system 502 are provided by way of an example for illustration purposes only. In will be appreciated by one skilled in the relevant art that several modifications may be made to computer system 502 without departing from the scope and spirit of the present invention. For example, some of the functions performed by processor 504 may be performed instead in graphics controller 540. In an alternative embodiment, graphics controller 540 and processor 504 may be implemented in a single semiconductor chip. In general the functions performed by individual components may be varied depending on the specific design requirements without departing from the scope and spirit of the present invention.

In an embodiment of the present invention, the attribute data for the plurality of appearances may be provided to computer system 502 by prestoring in secondary memory 510. Such attribute data may be retrieved into main memory 508 before being processed by processor 504 to generate new appearances. In an alternate embodiment, computer system 502 may receive attribute data from an external system.

Secondary memory 510 can include, for example, a hard disk drive 512 and/or a removable storage drive 514, representing a floppy disk drive, a magnetic tape drive, an optical disk drive, etc. The removable storage drive 514 reads from and/or writes to a removable storage unit 518 in a well known manner. Removable storage unit 518, represents a floppy disk, magnetic tape, optical disk, etc. which is read by and written to by removable storage drive 514. As will be appreciated, the removable storage unit 518 includes a computer usable storage medium having stored therein computer software and/or data.

In alternative embodiments, secondary memory 510 may include other similar means for allowing computer programs or other instructions to be loaded into computer system 502. Such means can include, for example, a removable storage unit 522 and an interface 520. Examples of such can include a program cartridge and cartridge interface (such as that found in video game devices), a removable memory chip (such as an EPROM, or PROM) and associated socket, and other removable storage units 522 and interfaces 520 which allow software and data to be transferred from the removable storage unit 518 to computer system 502.

Computer system 502 can also include a communications interface 524. Communications interface 524 allows software and data to be transferred between computer system 502 and external devices. Examples of communications interface 524 can include a modem, a network interface (such as an Ethernet card), a communications port, a PCMCIA slot and card, etc. Software and data transferred via communications interface 524 are in the form of signals which can be electronic, electromagnetic, optical or other signals capable of being received by communications interface 524. These signals 526 are provided to communications interface via a channel 528. This channel 528 carries signals 526 and can be implemented using wire or cable, fiber optics, a phone line, a cellular phone link, an RF link and other communications channels.

In this document, the terms "computer program medium" and "computer usable medium" are used to generally refer to media such as removable storage device 518, a hard disk installed in hard disk drive 512, and signals 526. These computer program products are means for providing software to computer system 502.

Computer programs (also called computer control logic) are stored in main memory and/or secondary memory 510. Computer programs can also be received via communications interface 524. Such computer programs, when executed, enable the computer system 502 to perform the features of the present invention as discussed herein. In particular, the computer programs, when executed, enable the processor 504 to perform the features of the present invention. Accordingly, such computer programs represent controllers of the computer system 502.

In an embodiment where the invention is implement using software, the software may be stored in a computer program product and loaded into computer system 502 using removable storage drive 514, hard drive 512 or communications interface 524. The control logic (software), when executed by the processor 504, causes the processor 504 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

7. Conclusion

Thus, the present invention is described in the context of several examples. While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method of morphing a texture attribute of an object to generate new appearances of the object, the object being comprised of one or more points, the object having a plurality of baseline appearances, the baseline appearances being comprised of a reference appearance and one or more relative appearances, wherein each of the points has a corresponding texture data element corresponding to the texture attribute for each of the plurality of baseline appearances, the method comprising the steps of:

(1) providing one or more texture data elements for each of the one or more points; and (2) combining two or more of the texture data elements for each of the one or more points to generate the new appearance of the object.

2. The method of claim 1, wherein the texture data element corresponding to the reference appearance of the object is a reference appearance texture data element and the texture data element corresponding to each of the one or more relative appearances of the object is a relative texture data element, wherein each relative texture data element is defined relative to the corresponding reference appearance texture data element and wherein step (1) further comprises the steps of:

(a) storing the reference appearance texture data element; and (b) storing the relative texture data element for each of the relative appearances of the object.

3. The method of claim 2, wherein step (2) further comprises the steps of:

(a) combining the reference appearance texture data element with the corresponding relative texture data elements according to respective weights; and (b) enabling a user to provide said respective weights.

4. The method of claim 1, wherein the texture data element corresponding to the reference appearance of the object is a reference appearance texture data element and the texture data element corresponding to each of the one or more relative appearances of the object is a relative texture data element, wherein each relative texture data element is defined relative to the corresponding reference appearance texture data element, wherein each of the texture data elements has a respective weight, and wherein step (2) further comprises the steps of:

(a) enabling a user to provide the respective weights; and (b) adding each of said corresponding texture data elements according to the respective weights to generate the new appearance.

5. The method of claim 1, wherein the object is a face and wherein each of the plurality of baseline appearances comprises an expression.

6. A method of morphing a surface normal vector attribute of an object to generate new appearances of the object, the object being comprised of one or more points, the object having a plurality of baseline appearances, the baseline appearances being comprised of a reference appearance and one or more relative appearances, wherein each of the points has a corresponding surface normal vector data element corresponding to the surface normal vector attribute for each of the plurality of baseline appearances, the method comprising the steps of:

(1) providing one or more surface normal vector data elements for each of the one or more points; and (2) combining two or more of the surface normal vector data elements for each of the one or more points to generate the new appearance of the object.

7. The method of claim 6, wherein the surface normal vector data element corresponding to the reference appearance of the object is a reference appearance surface normal vector data element and the surface normal vector data element corresponding to each of the one or more relative appearances of the object is a relative surface normal vector data element, wherein each relative surface normal vector data element is defined relative to the corresponding reference appearance surface normal vector data element and wherein step (1) further comprises the steps of:

(a) storing the reference appearance surface normal vector data element; and (b) storing the relative surface normal vector data element for each of the relative appearances of the object.

8. The method of claim 7, wherein step (2) further comprises the steps of:

(a) combining the reference appearance surface normal vector data element with the corresponding relative surface normal vector data elements according to respective weights; and (b) enabling a user to provide said respective weights.

9. The method of claim 6, wherein the surface normal vector data element corresponding to the reference appearance of the object is a reference appearance surface normal vector data element and the surface normal vector data element corresponding to each of the one or more relative appearances of the object is a relative surface normal vector data element, wherein each relative surface normal vector data element is defined relative to the corresponding reference appearance surface normal vector data element, wherein each of the surface normal vector data elements has a respective weight, and wherein step (2) further comprises the steps of:

(a) enabling a user to provide the respective weights; and (b) adding each of said corresponding surface normal vector data elements according to the corresponding weights to generate said new appearance.

10. The method of claim 6, wherein the object is a face and wherein each of the plurality of baseline appearances comprises an expression.

11. A system for morphing a texture attribute of an object to generate new appearances of the object, the object being comprised of one or more points, the object having a plurality of baseline appearances, the baseline appearances being comprised of a reference appearance and one or more relative appearances, wherein each of the points has a corresponding texture data element corresponding to the texture attribute for each of the plurality of baseline appearances, the system comprising providing means for providing one or more texture data elements for each of the one or more points; and combining means for combining two or more of the texture data elements for each of the one or more points to generate the new appearance of the object.

12. The system of claim 11, wherein the texture data element corresponding to the reference appearance of the object is a reference appearance texture data element and the texture data element corresponding to each of the one or more relative appearances of the object is a relative texture data element, wherein each relative texture data element is defined relative to the corresponding reference appearance texture data element and wherein said providing means further comprises first storing means for storing the reference appearance texture data element; and second storing means for storing the relative texture data element for each of the relative appearances of the object.

13. The system of claim 11, wherein the texture data element corresponding to the reference appearance of the object is a reference appearance texture data element and the texture data element corresponding to each of the one or more relative appearances of the object is a relative texture data element, wherein each relative texture data element is defined relative to the corresponding reference appearance texture data element, wherein each of the texture data elements has a respective weight, and wherein said combining means further comprises enabling means for enabling a user to provide the respective weights; and adding means for adding each of said corresponding texture data elements according to the respective weights to generate the new appearance.

14. A system for morphing a surface normal vector attribute of an object to generate new appearances of the object, the object being comprised of one or more points, the object having a plurality of baseline appearances, the baseline appearances being comprised of a reference appearance and one or more relative appearances, wherein each of the points has a corresponding surface normal vector data element corresponding to the surface normal vector attribute for each of the plurality of baseline appearances, the system comprising providing means for providing one or more surface normal vector data elements for each of the one or more points; and combining means for combining two or more of the surface normal vector data elements for each of the one or more points to generate the new appearance of the object.

15. The system of claim 14, wherein the surface normal vector data element corresponding to the reference appearance of the object is a reference appearance surface normal vector data element and the surface normal vector data element corresponding to each of the one or more relative appearances of the object is a relative surface normal vector data element, wherein each relative surface normal vector data element is defined relative to the corresponding reference appearance surface normal vector data element and wherein said providing means further comprises first storing means for storing the reference appearance surface normal vector data element; and second storing means for storing the relative surface normal vector data element for each of the relative appearances of the object.

16. The system of claim 14, wherein the surface normal vector data element corresponding to the reference appearance of the object is a reference appearance surface normal vector data element and the surface normal vector data element corresponding to each of the one or more relative appearances of the object is a relative surface normal vector data element, wherein each relative surface normal vector data element is defined relative to the corresponding reference appearance surface normal vector data element, wherein each of the surface normal vector data elements has a respective weight, and wherein said combining means further comprises enabling means for enabling a user to provide the respective weights; and adding means for adding each of said corresponding surface normal vector data elements according to the respective weights to generate the new appearance.

17. A computer program product for use with a computer system comprising a host processor, a main memory, a graphics controller, and a display unit for morphing a texture attribute of an object to generate new appearances of the object, the object being comprised of one or more points, the object having a plurality of baseline appearances, the baseline appearances being comprised of a reference appearance and one or more relative appearances, wherein each of the points has a corresponding texture data element corresponding to the texture attribute for each of the plurality of baseline appearances, the computer program product comprising a computer readable program code means for providing one or more texture data elements for each of the one or more points; and a computer readable program code means for combining two or more of the texture data elements for each of the one or more points to generate the new appearance of the object.

18. The computer program product of claim 17, wherein the texture data element corresponding to the reference appearance of the object is a reference appearance texture data element and the texture data element corresponding to each of the one or more relative appearances of the object is a relative texture data element, wherein each relative texture data element is defined relative to the corresponding reference appearance texture data element and wherein said computer readable program code means for providing further comprises a first computer readable program code means for storing the reference appearance texture data element; and a second computer readable program code means for storing the relative texture data element for each of the relative appearances of the object.

19. The computer program product of claim 18 wherein said computer readable program code means for combining comprises a computer readable program code means for combining the reference appearance texture data element with the corresponding relative texture data element according to respective weights; and a computer readable program code means for enabling a user to interactively provide said respective weights.

20. The computer program product of claim 17, wherein the texture data element corresponding to the reference appearance of the object is a reference appearance texture data element and the texture data element corresponding to each of the one or more relative appearances of the object is a relative texture data element, wherein each relative texture data element is defined relative to the corresponding reference appearance texture data element, wherein each of the texture data elements has a respective weight, and wherein said computer readable program code means for combining comprises a computer readable program code means for enabling a user to provide respective weights; and a computer readable program code means for adding each of said corresponding texture data elements according to the respective weights to generate the new appearance.

21. A computer program product for use with a computer system comprising a host processor, a main memory, a graphics controller, and a display unit for morphing a surface normal vector attribute of an object to generate new appearances of the object, the object being comprised of one or more points, the object having a plurality of baseline appearances, the baseline appearances being comprised of a reference appearance and one or more relative appearances, wherein each of the points has a corresponding surface normal vector data element corresponding to the surface normal vector attribute for each of the plurality of baseline appearances, the computer program product comprising a computer readable program code means for providing one or more surface normal vector data elements for each of the one or more points; and a computer readable program code means for combining two or more of the surface normal vector data elements for each of the one or more points to generate the new appearance of the object.

22. The computer program product of claim 21, wherein the surface normal vector data element corresponding to the reference appearance of the object is a reference appearance surface normal vector data element and the surface normal vector data element corresponding to each of the one or more relative appearances of the object is a relative surface normal vector data element, wherein each relative surface normal vector data element is defined relative to the corresponding reference appearance surface normal vector data element and wherein said computer readable program code means for providing further comprises a first computer readable program code means for storing the reference appearance surface normal vector data element; and a second computer readable program code means for storing the relative surface normal vector data element for each of the relative appearances of the object.

23. The computer program product of claim 22 wherein said computer readable program code means for combining comprises a computer readable program code means for combining the reference appearance surface normal vector data element with the corresponding relative surface normal vector data element according to respective weights; and a computer readable program code means for enabling a user to interactively provide said respective weights.

24. The computer program product of claim 21, wherein the surface normal vector data element corresponding to the reference appearance of the object is a reference appearance surface normal vector data element and the surface normal vector data element corresponding to each of the one or more relative appearances of the object is a relative surface normal vector data element, wherein each relative surface normal vector data element is defined relative to the corresponding reference appearance surface normal vector data element, wherein each of the surface normal vector data elements has a respective weight, and wherein said computer readable program code means for combining comprises a computer readable program code means for enabling a user to provide respective weights; and a computer readable program code means for adding each of said corresponding surface normal vector data elements according to the respective weights to generate the new appearance.

* * * * *

UNITED STATES PATENT AND TRADEMARK OFFICE
CERTIFICATE OF CORRECTION

PATENT NO. : 6,407,743 B1
DATED : June 18, 2002
INVENTOR(S) : Michael T. Jones

It is certified that error appears in the above-identified patent and that said Letters Patent is hereby corrected as shown below:

Column 6,
Line 67, please delete "$aa]_{170}$" and insert therefor -- $za]_{170}$ --.

Column 9,
Line 8, please delete "Surface Normal Vector$_{40}$" and insert therefor -- Surface Normal Vector$_{140}$ --.

Signed and Sealed this

Twenty-ninth Day of October, 2002

*Attest:*

*Attesting Officer*

JAMES E. ROGAN
*Director of the United States Patent and Trademark Office*